United States Patent
Losio et al.

(10) Patent No.: US 8,075,199 B2
(45) Date of Patent: Dec. 13, 2011

(54) FORM FACTOR ADAPTER MODULE

(75) Inventors: Giacomo Losio, Tortona (IT); Giovanni Giobbio, Rovellasca (IT); Maurizio Gazzola, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/557,114

(22) Filed: Sep. 10, 2009

(65) Prior Publication Data

US 2011/0058777 A1   Mar. 10, 2011

(51) Int. Cl.
*G02B 6/36* (2006.01)

(52) U.S. Cl. ......................................................... 385/92

(58) Field of Classification Search ........................ None
See application file for complete search history.

(56) References Cited

U.S. PATENT DOCUMENTS

| | | | |
|---|---|---|---|
| 7,044,656 B1 * | 5/2006 | Hofmeister et al. | 385/89 |
| 7,178,996 B2 * | 2/2007 | Malagrino et al. | 385/92 |
| 7,179,096 B2 * | 2/2007 | Dube et al. | 439/76.1 |
| 7,403,548 B2 | 7/2008 | Muth et al. | |
| 7,577,855 B2 | 8/2009 | Dove | |
| 2002/0027690 A1 | 3/2002 | Bartur et al. | |
| 2004/0110406 A1 * | 6/2004 | Phillips et al. | 439/352 |
| 2006/0189220 A1 * | 8/2006 | Duval et al. | 439/760 |
| 2006/0216958 A1 | 9/2006 | Yee et al. | |
| 2006/0291785 A1 * | 12/2006 | Epitaux et al. | 385/92 |
| 2007/0134961 A1 * | 6/2007 | Myong et al. | 439/160 |
| 2007/0297733 A1 * | 12/2007 | Mader et al. | 385/123 |
| 2009/0257754 A1 * | 10/2009 | Theodoras et al. | 398/135 |

OTHER PUBLICATIONS

Spilman, Antony "A Cooperation Agreement for 10 Gigabit Ethernet Transceiver Package", Xenpak SA, Rev 3.0, Issue 3.0, (Sep. 18, 2002), pp. 1-77.
SFF Committee; INF-8074i Specification for SFP (Small Formfactor Pluggable) Transceiver, Rev 1.0; SFF Committee ftp://ftp.seagate.com/ff, (May 12, 2001), pp. 1-38.
SFF-8083 Specification for 0.8mm SFP+ Compliant Card Edge Connector, Rev 1.2, (Nov. 2, 2007), pp. 1-20.
SFF-8431 Specification for Enhanced 8,5 and 10 Gigabit Small Form Factor Pluggable Module "SFP+", SFF Committee, Revision 2.1, (Aug. 30, 2007), pp. 1-109.
SFF—8432 Specification for Improved Pluggable Formfactor, SFF Committee, SFF-8432 Rev 5.0, (Jul. 16, 2007), pp. 1-17.
SFF-8472 Diagnostic Monitoring Interface for Optical Transceivers, SFF Committee; Rev 10.3, (Dec. 1, 2007), pp. 1-36.
Quanta Computer Selects AMCC's QT2025 10GbE PHY for Its High Density Switching Platform, Applied Micro Circuits Corporation, (retrieved from http://investor.amcc.com/releasedetail.cfm?releaseid=295761), (Feb. 25, 2008), pp. 1-2.

(Continued)

*Primary Examiner* — Uyen Chau N Le
*Assistant Examiner* — Chris Chu
(74) *Attorney, Agent, or Firm* — Brake Hughes Bellermann LLP (57) ABSTRACT

Various example embodiments are disclosed. According to an example embodiment, a form factor adapter module may include a small form factor (SFF) host connector configured to receive a small form factor pluggable (SFP or SFP+) module and to transmit and receive data according to a Serializer-deserializer Framer Interface (SFI) protocol. The form factor adapter module may also include a 10 Gigabit Ethernet Small Form-Factor Pluggable (XFP) edge finger connector configured to transmit and receive data to and from the SFF host connector according to the SFI protocol and to mate with an XFP edge finger socket.

20 Claims, 4 Drawing Sheets

OTHER PUBLICATIONS

Tsumura, Eddie EDC Vendors Highlight Inte roperability with ExceLight SFP+ Transceivers, (retrieved from 6,18-20 http://www.excelight.com/a boutlpr/ExceLightSFP+EDCInte ropDemos-final.pdf), (Mar. 3, 2007), pp. 1-5.

International Search Report & Written Opinion received for PCT Application No. PCT/US2009/040244, mailed on Jun. 17, 2009, 12 Pages.

Spilman, Antony, "A Cooperation Agreement for 10 Gigabit Ethernet Transceiver Package", Xenpak SA, Rev 3.0, Issue 3.0, Sep. 18, 2002, 77 pages.

"SFF Committee; INF-8074i Specification for SFP (Small Formfactor Pluggable) Transceiver", Revision 1.0; SFF Committee, May 12, 2001, 38 pages.

"SFF-8083 Specification for 0.8mm SFP+ Compliant Card Edge Connector", SFF Committee, Revision 1.2, Nov. 2, 2007, 20 pages.

"SFF-8431 Specifications for Enhanced 8,5 and 10 Gigabit Small Form Factor Pluggable Module SFP+", SFF Committee, Revision 2.1, Aug. 30, 2007, 109 pages.

International Search Report & Written Opinion received for PCT Application No. PCT/US2009/040244, mailed on Jun. 17, 2009, 12 Pages.

"SFF-8432 Specification for Improved Pluggable Formfactor", SFF Committee, Revision 5.0, Jul. 16, 2007, 17 pages.

"SFF-8472 Specification for Diagnostic Monitoring Interface For Optical Transceivers", SFF Committee, Revision 10.3, Dec. 1, 2007, 36 pages.

"Quanta Computer Selects AMCC's QT2025 10GbE PHY for Its High Density Switching Platform", Applied Micro Circuits Corporation, Feb. 25, 2008, 2 pages.

Tsumura, Eddie, "EDC Vendors Highlight Interoperability with ExceLight SFP+ Transceivers", Mar. 23, 2007, 5 pages.

U.S. Appl. No. 12/102,478, Non-Final Office Action mailed Feb. 17, 2011, 20 pages.

Vitesse, "10 Gbps XAUI or XGMII to XFI LAN/WAN Transceiver", 10 Ge PHYs, Product VSC8486, retrieved on May 9, 2011, web page available at: http://www.vitesse.com/products/product.php?number=VSC8486.

"AMCC Demonstrates QT2035S at ECOC 2006", Applied Micro Circuits Corp., Sep. 25, 2006, 2 pages.

International Preliminary Report on Patentability received for PCT Patent Application No. PCT/US2009/040244, mailed on Oct. 28, 2010, 7 pages.

Vitesse, "Ethernet Product VSC8486", Product Brief, VPPD-01396, Revision 1.1, Copyright 2006-2007, 2 pages.

Hardy, Stephen, "EDC vendors try again on LRM", Lightwave Issue, Lightwave Online, Apr. 30, 2007, 4 pages.

Office Action Response filed for U.S. Appl. No. 12/102,478, filed May 17, 2011, 15 pages.

U.S. Appl. No. 12/102,478 Final Office Action mailed Sep. 13, 2011, 21 pages.

* cited by examiner

FORM FACTOR ADAPTER MODULE

TECHNICAL FIELD

This description relates to communications systems.

BACKGROUND

In general, a fiber optic transceiver is a communications device having an optical interface and an electrical interface. The optical interface transmits and receives fiber optic signals (e.g., through a set of fiber optic cables). The electrical interface transmits and receives electrical signals (e.g., through a circuit board connector mounted to a printed circuit board or PCB).

Ten Gigabit Ethernet Small Form-Factor Pluggable (XFP) is a standard "off-the-shelf" fiber optic transceiver package often used for IEEE 802.3ae Ethernet communications. The electrical interface of an XFP module operates according to an XFI protocol, and has a thirty-pin electrical interface. An XFP edge finger socket may receive and mate with an XFP edge finger connector.

Small form factor pluggable (SFP or SFP+) modules are also standard "off-the-shelf" fiber optic transceiver packages which are optimized for high-speed fiber optic channel applications. Both SFP modules and SFP+ modules include electrical interfaces and have twenty-pin electrical interfaces which plug into a small form factor (SFF) host connector. The electrical interface of an SFP module may operate according to an SFP protocol such as Serial Gigabit Media Independent Interface (SGMII). The electrical interface of an SFP+ module operates according to the SFI protocol. In general, the physical form factor of an SFP or SFP+ fiber optic transceiver is smaller than an XFP fiber optic transceiver.

DETAILED DESCRIPTION

Overview

According to one general aspect, a form factor adapter module may include a small form factor (SFF) host connector configured to receive a small form factor pluggable (SFP or SFP+) module and to transmit and receive data according to a Serializer-deserializer Framer Interface (SFI) protocol. The form factor adapter module may also include a ten (10) Gigabit Ethernet Small Form-Factor Pluggable (XFP) edge finger connector configured to transmit and receive data to and from the SFF host connector according to the SFI protocol and to mate with an XFP edge finger socket.

According to another general aspect, a method may include receiving, by a small form factor (SFF) host connector, a small form factor pluggable (SFP or SFP+) module, and transmitting and receiving data according to a Serializer-deserializer Framer Interface (SFI) protocol. The method may also include transmitting and receiving data, by a 10 Gigabit Ethernet Small Form-Factor Pluggable (XFP) edge finger connector, to and from the SFF host connector according to an XFI protocol. The method may also include mating, by the XFP edge finger connector, with an XFP edge finger socket.

Description

Figure 1:
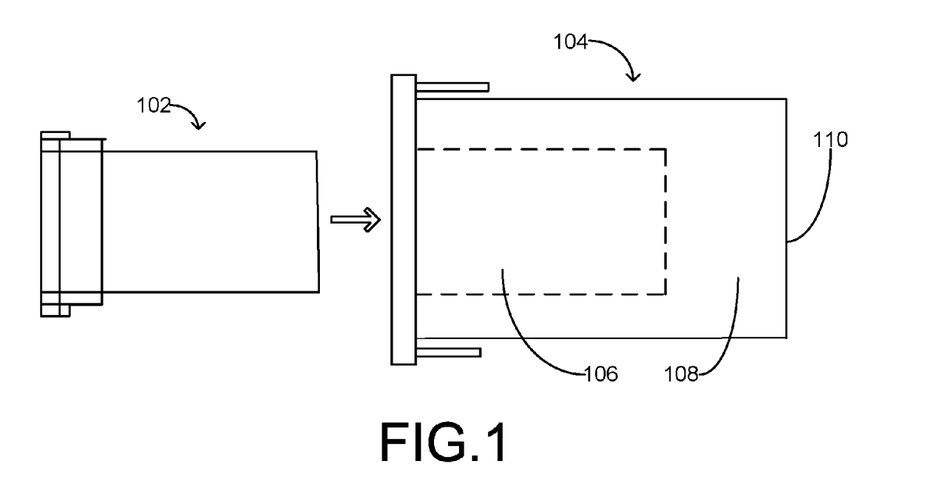
FIG. 1 is a top view of a small form factor pluggable (SFP or SFP+) module and a form factor adapter module according to an example embodiment.

FIG. 1 is a top view of a small form factor pluggable (SFP or SFP+) module 102 and a form factor adapter module 104 according to an example embodiment. The SFP or SFP+ module 102 may include a standard, "off the shelf" SFP or SFP+ pluggable module. The SFP or SFP+ module 102 may, for example, be configured to be inserted into a small form factor (SFF) host connector or cage, such as a SFF host connector 106 included in the form factor adapter module 104. The SFP or SFP+ module 102 may include a twenty-pin electrical interface, described with reference to FIG. 5.

The form factor adapter module 104 may include a housing 108. The housing 108 may, for example, comprise a metal or metal alloy, such as aluminum, copper or steel, or a plastic material, according to example embodiments. The housing 108 may have a form factor to allow the form factor adapter module 104 to receive and mate with the SFP or SFP+ module 102. The housing 108 may also have a form factor to allow the form factor adapter module 104 to fit into, or mate with, an XFP edge finger socket. The housing 108 may, for example, be of a size to allow the form factor adapter module 104 and/or the XFP edge finger connector 110 to fit into and mate with the XFP edge finger socket, and large enough to accommodate the SFF host connector 106 which receives the SFP or SFP+ module 102.

The form factor adapter module 104 may include the SFF host connector 106 or cage. The SFF host connector 106 may include an SFP or SFP+ cage. The SFF host connector 106 may receive the SFP or SFP+ module 102, and may transmit and receive data to and from the SFP or SFP+ module. The SFF host connector 106 may transmit and receive the data according to a Serializer-deserializer Framer Interface (SFI) protocol. The SFF host connector 106 may, for example, include twenty pins or electrical contacts; one differential pair of these pins or electrical contacts may be used for transmitting data, and another differential pair may be used for receiving the data, for a total of four pins or electrical contacts used for transmitting and receiving data. The remaining pins or electrical contacts may be used to carry power, control signals, or for alarms, according to an example embodiment. The dashed lines in FIG. 1 show the SFF host connector 106 or cage which receives the SFP or SFP+ module 102. The housing 108 may enclose at least a portion of the SFF host connector 106.

The form factor adapter module 104 may also include a Ten (10) Gigabit Ethernet Small Form-Factor Pluggable (XFP) edge finger connector 110. The XFP edge finger connector 110 may mate with the XFP edge finger socket or XFP cage. The XFP edge finger connector 110 may also transmit and receive data to and from the SFF host connector 106, and to and from the XFP edge finger socket, according to an XFI protocol. The XFP edge finger connector 110 may, for example, include thirty pins or electrical contacts; one differential pair of these pins or electrical contacts may be used for transmitting and receiving the data. The remaining pins or electrical contacts may be used to carry power, control signals, or for alarms, according to an example embodiment. The XFP edge finger connector 110 may relay data between the SFF host connector 106 and the XFP edge finger socket; likewise, the SFF host connector 106 may relay data between the SFP or SFP+ module 102 and the XFP edge finger connector 110. In an example embodiment, the data may be relayed via a clock and data recovery circuit (CDR), described with reference to FIG. 5. The housing 108 may enclose at least a portion of the XFP edge finger connector 110.

The housing 108 may also enclose an electrical interface (described below with reference to FIG. 5) which transmits and receives (or relays) the data between the SFF host connector 106 and the XFP edge connector 110. The electrical interface may, for example, include twenty pins or electrical contacts on a side which interfaces with the SFF host connector 106, and may include thirty pins or electrical contacts on a side which interfaces with the XFP edge finger connector 110.

Figure 2:
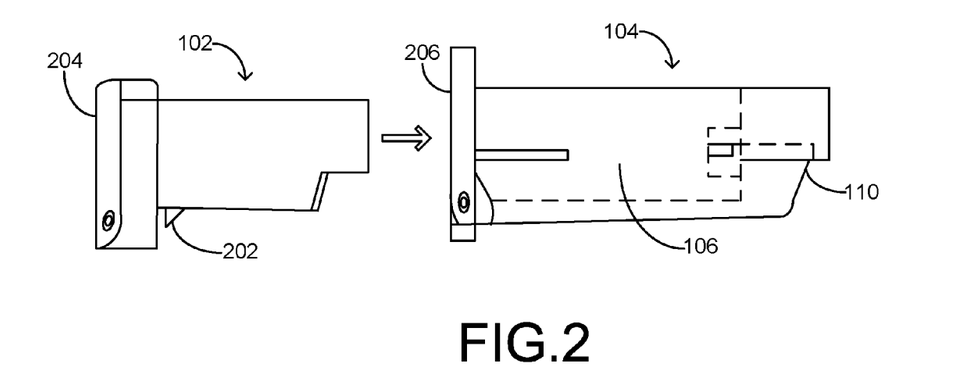
FIG. 2 is a side view of the SFP or SFP+ module and the form factor adapter module according to an example embodiment.

FIG. 2 is a side view of the SFP or SFP+ module 102 and the form factor adapter module 104 according to an example embodiment. This view shows a protrusion 202 of the SFP or SFP+ module 102. The protrusion 202 may secure the SFP or SFP+ module 102 into the SFF host connector 106 of the form factor adapter module 104. The protrusion 202 may, for example, include a wedged, diamond-shaped, or triangular extension from the SFP or SFP+ module 102. The protrusion 202 may have a ramp-like shape which allows the protrusion 202 to gradually enter an aperture (shown in FIG. 3) of the SFF host connector 106 as the SFP or SFP+ module is inserted into the SFF host connector 106; a vertical edge of the protrusion 202, which may be generally perpendicular to the plane along which the SFP or SFP+ module travels when the SFP or SFP+ module is inserted into the SFF host connector 106, may press against an edge of the aperture, locking the protrusion 202 into the aperture and securing the SFP or SFP+ module 102 into the SFF host connector 106. The protrusion 202 may, for example, secure the SFP or SFP+ module 102 into the SFF host connector 106 of the form factor adapter module 104 in combination with a latch mechanism, lock feature, or cage spring cut-out, described further with reference to FIG. 3.

The SFP or SFP+ module 102 may also include a lever 204. The lever 204 may be used by a human operator to move the aperture, latch mechanism, lock feature, or cage spring cut-out of the SFF host connector 106 of the form factor adapter module 104, thereby releasing the protrusion 202 and SFP or SFP+ module 102. The form factor adapter module 104 may also include a lever 206 which may be used by the operator to release the form factor adapter module 104 from the XFP edge finger socket.

Figures 3, 4:
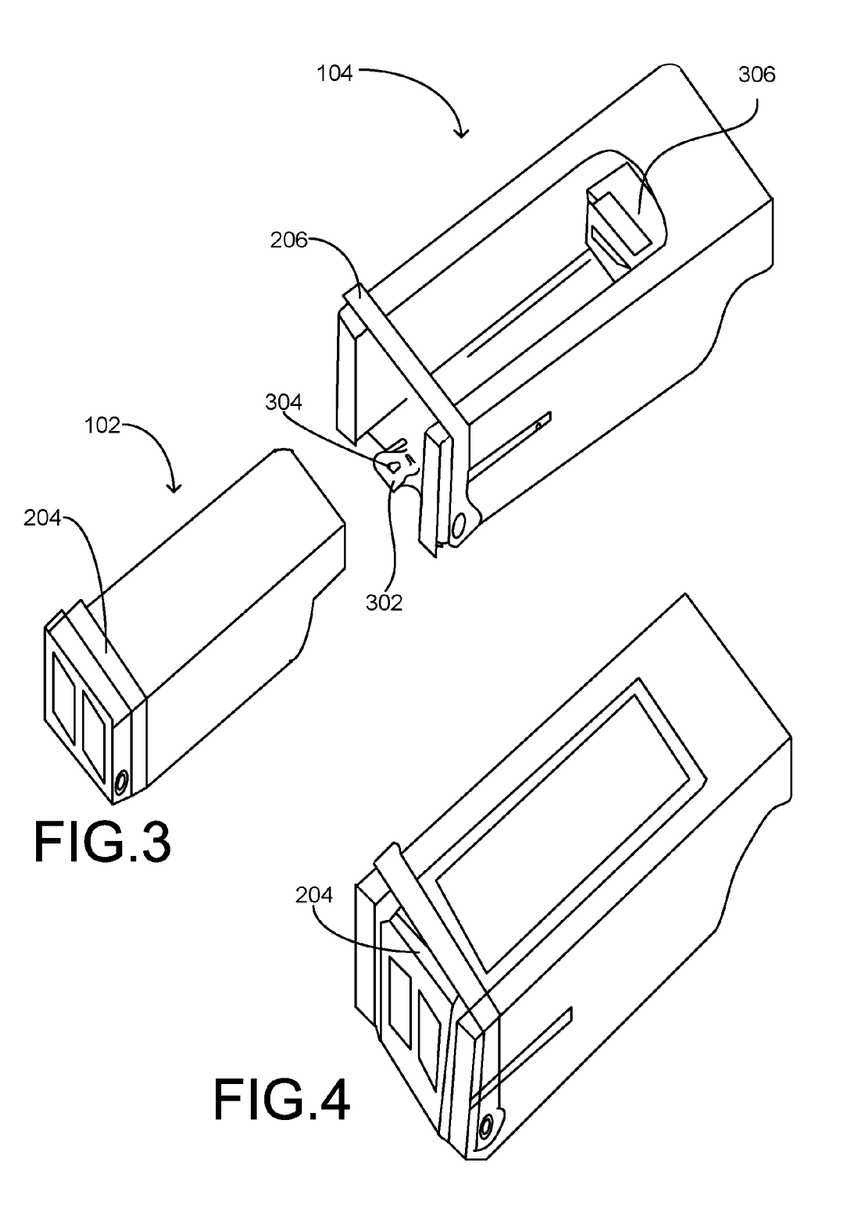
FIG. 3 is a perspective view of the SFP or SFP+ module and the form factor adapter module according to an example embodiment.
FIG. 4 is a perspective view of the SFP or SFP+ module inserted into the form factor adapter module according to an example embodiment.

FIG. 3 is a perspective view of the SFP or SFP+ module 102 and the form factor adapter module 104 according to an example embodiment. This perspective view shows the latch mechanism 302, lock feature, or cage spring cut-out included in the form factor adapter module 104. The latch mechanism 302, lock feature, or cage spring cut-out may be configured to secure the SFP or SFP+ module 102 into the SFF host connector 106. The latch mechanism 302, lock feature, or cage spring cut-out may be rigid enough to secure the SFP or SFP+ module 102, yet flexible enough to bend and release the SFP or SFP+ module 102 in response to pressure from the lever 204. The latch mechanism 302, lock feature, or cage spring cut-out may, for example, include the aperture 304 configured to receive the protrusion 202 (shown in FIG. 2). The aperture 304 may be shaped or configured to receive the protrusion 202 and thereby lock the SFP or SFP+ module 202 into the SFF host connector 106. The aperture 304 may, for example, have a shape, such as a wedge, diamond, or triangle, corresponding to the shape of the protrusion 202.

The form factor adapter module 104 may also include the electrical interface 306. The electrical interface 306 may transmit and receive (or relay) data between the SFF host connector 106 and the XFP edge connector 110, and is described below with reference to FIG. 5.

FIG. 4 is a perspective view of the SFP or SFP+ module 102 inserted into the form factor adapter module 104 according to an example embodiment. The SFP or SFP+ module 102 may be secured into the form factor adapter module 104 until an operator releases the SFP or SFP+ module using the lever 204, according to an example embodiment.

Figure 5:
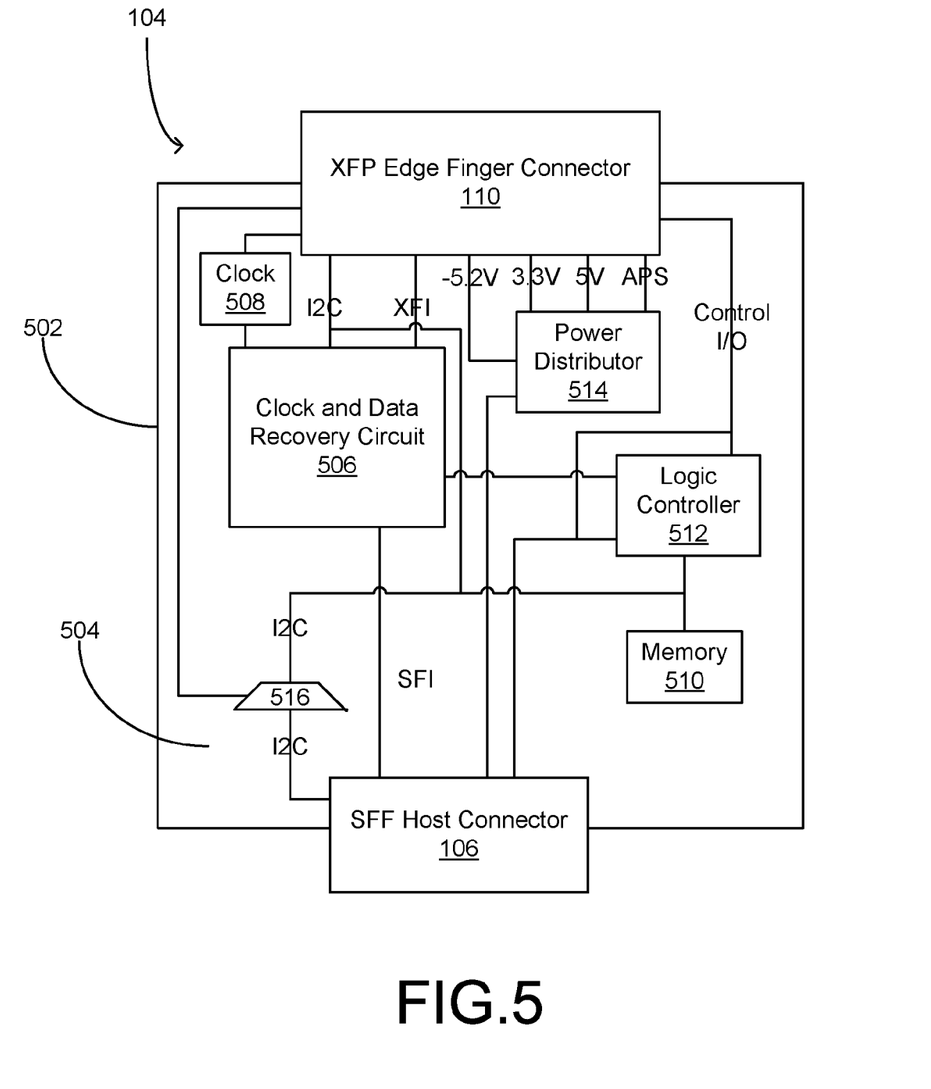
FIG. 5 is a block diagram of the form factor adapter module showing the electrical interface according to an example embodiment.

FIG. 5 is a block diagram of the form factor adapter module 104 showing the electrical interface 502 according to an example embodiment. The electrical interface 502 may be arranged on a printed circuit board (PCB) 594, which may allow any or all of the components described below to be mounted onto the form factor adapter module 104 and/or electrical interface 502.

The SFF host connector 106 may be mounted onto the PCB 504, according to an example embodiment. The XFP edge finger connector 110 may also be mounted onto the PCB 504, according to an example embodiment.

The electrical interface 502 may also include a clock and data recovery circuit 506. The clock and data recovery circuit 506 may retime data transferred between the SFF host connector 106 and the XFP edge finger connector 110. The clock and data recovery circuit 506 may retime the data based on a clock 508. The clock 508 may be mounted onto the PCB 504, and may provide clock impulses to the clock and data recovery circuit 506; the clock 508 may receive a reference clock signal from a host card via the XFP edge finger connector 110. The clock and data recovery circuit 506 may be secured to the PCB 504. The clock and data recovery circuit 506 may receive control information from the XFP edge finger connector 110 via an inter-integrated circuit (e.g., I2C) bus; the SFP or SFP+ module 102 may receive control signals via the I2C bus, according to an example embodiment. The XFP module may have dedicated pins or electrical contacts (such as pins 24 and 25 in the example table shown below) which are coupled to the clock and data recovery circuit 506, according to an example embodiment. The clock and data recovery circuit 506 may also have an electronic dispersion compensator (EDC) for recovering signals and/or compensating for distortions caused by the transmission medium or media, according to an example embodiment.

A dedicated pin or electrical contact, such as a MOD_DESEL, pin 3, of the XFP module, may control whether the SFP or SFP+ module communicates via the I2C bus. The XFP module may control whether the SFP or SFP+ module communicates via the bus by, for example, controlling a control pin of a multiplexer 516. In an example embodiment in which multiple SFP modules and/or SFP+ modules are connected to the form factor adapter module 104, the XFP module may control which of the SFP or SFP+ modules communicates via the I2C control path at a given time.

The clock and data recovery circuit 506 may also be configured to receive data from both the SFF host connector 106 and the XFP edge finger connector 110 according to the SFI protocol and the XFI protocol, respectively. The data may be transmitted between the SFF host connector 106 and the XFP edge finger connector 110 via a single differential pair. Power, some control signals, and/or some alarms may be transmitted from the XFP edge finger connector 110 via dedicated pins or electrical contacts, according to an example embodiment. The I2C control path may be used for optical performance monitoring alarms (such as input/output power and/or laser bias), and/or inventory information (such as serial number, lot code, and/or part number), according to an example embodiment. In an example embodiment, the twenty pins or electrical contacts of the SFF host connector 106 may map to the thirty pins or electrical contacts of the XFP edge finger connector 110 as shown in the following table:

The parenthetical (1) indicates that the pin may be used to mute I2C lines inside the form factor adapter module 104 (e.g., multiple XFP pins may be connected on the same I2C bus, while multiple SFP pins may not). This function may be realized with a multiplexer that switches off the I2C lines when the form factor adapter module 104 is not in use. The parentheticals (2) indicate that power supplies may be used by the clock and data recovery circuit 506.

The electrical interface 502 may also include a memory 510. The memory 510 may be secured to the PCB 504, and may be coupled to the clock and data recovery circuit 506. The memory 510 may, for example, provide inventory infor-

| XFP Pin # | Logic-I/O | Symbol | Description | SFP+ pin # |
|---|---|---|---|---|
| 1 | | GND | Module Ground | 1, 20, 14, 17, 11, 9, 10 |
| 2 | | VEE5 | Optional −5.2 V Power Supply | Not used (2) |
| 3 | LVTTL-I | MOD_DESEL | Module De-select. When held low allows the module to respond to 2-wire serial interface command | Not used (1) |
| 4 | LVTTL-O | INTERRUPT | Interrupt. Indicates presence of an important condition which can be read over the serial 2-wire interface | Not used |
| 5 | LVTTL-I | TX_DIS | Transmitter Disable. When high, disables the laser. | 3 |
| 6 | | VCC5 | +5 V Power Supply | Not used (2) |
| 7 | | GND | Module Ground | 1 |
| 8 | | VCC3 | +3.3 V Power Supply | 15, 16 (2) |
| 9 | | VCC3 | +3.3 V Power Supply | 15, 16 (2) |
| 10 | LVTTL-I | SCA | Two wire Interface Clock | 5 |
| 11 | LVTTL-I/O | SDA | Two Wire Interface Data Line | 4 |
| 12 | LVTTL-O | MOD_ABS | Indicates Module is not Present. Grounded in the Module | 6 |
| 13 | LVTTL-O | MOD_NR | Module not Ready; Indicating Module Operational Fault | Not used, pulled up |
| 14 | LVTTL-O | RX_LOS | Receiver Loss of Signal Indicator | 8 |
| 15 | | GND | Module Ground | 1, 20, 14, 17, 11, 9, 10 |
| 16 | | GND | Module Ground | 1, 20, 14, 17, 11, 9, 10 |
| 17 | CML-O | RD− | Receiver Inverted Data Output | 12 |
| 18 | CML-O | RD+ | Receiver Non-Inverted Data Output | 13 |
| 19 | | GND | Module Ground | 1, 20, 14, 17, 11, 9, 10 |
| 20 | | VCC2 | 1.8 V Power Supply | Not used (2) |
| 21 | LVTTL-I | P_DOWN/RST | Power Down; When high, places the module in the low power standby mode and on the falling edge of P_DOWN initiates a complete reset of the module including the 2 wire management interface. | Not used |
| 22 | | VCC2 | 1.8 V Power Supply | Not used (2) |
| 23 | | GND | Module Ground | 1, 20, 14, 17, 11, 9, 10 |
| 24 | PECL-I | REFCLK+ | Reference Clock Non-Inverted Input, AC coupled on the host board | Reference clock for CDR if applicable or terminated |
| 25 | PECL-I | REFCLK− | Reference Clock Inverted Input, AC coupled on the host board | Reference clock for CDR if applicable or terminated |
| 26 | | GND | Module Ground | 1, 20, 14, 17, 11, 9, 10 |
| 27 | | GND | Module Ground | 1, 20, 14, 17, 11, 9, 10 |
| 28 | CML-I | TD− | Transmitter Inverted Data Input | 19 |
| 29 | CML-I | TD+ | Transmitter Non-Inverted Data Input | 19 |
| 30 | | GND | Module Ground | 1, 20, 14, 17, 11, 9, 10 | mation, parameters, and/or instructions to the clock and data recovery circuit 510, to the logic controller 512, and/or to the I2C buses. The memory 510 may also, for example, maintain identity information and perform monitoring functions, such as monitoring power levels of the form factor adapter module 104.

In the example shown in FIG. 5, the form factor adapter module 104 may include a logic controller 512. The logic controller 512 may be secured to the PCB 504. The logic controller 512 may be coupled to any or all of the SFF host connector 106, the XFP edge finger connector 110, the clock and data recovery circuit 506 and the memory 510. The logic controller 512 may, for example, include reset logic, and may reset any or all of the SFF host connector 106, the XFP edge finger connector 110, and the clock and data recovery circuit 506. The logic controller 512 may, for example, send instructions to the clock and data recovery circuit 506.

The form factor adapter module 100 may also include a power distributor 514. The power distributor 514 may be secured to the PCB 504. The power distributor 514 may, for example, be coupled to and receive power from the XFP edge finger connector 110. In an example embodiment, the power distributor 514 may receive a plurality of voltage levels from the XFP edge finger connector 110, such as 3.3 volts, 5 volts, −5.2 volts and/or an adaptive power supply (APS) (which may be 1.8 volts for XFP). The XFP edge finger connector 110 may in turn receive power from a network device coupled to the XFP edge finger connector 110. The power distributor 514 may distribute power to any or all of the devices within the form factor adapter module 104, such as the SFF host connector 106, the XFP edge finger connector 110, the clock 508, the memory 510, and/or the logic controller 512, according to various example embodiments.

Figure 6:
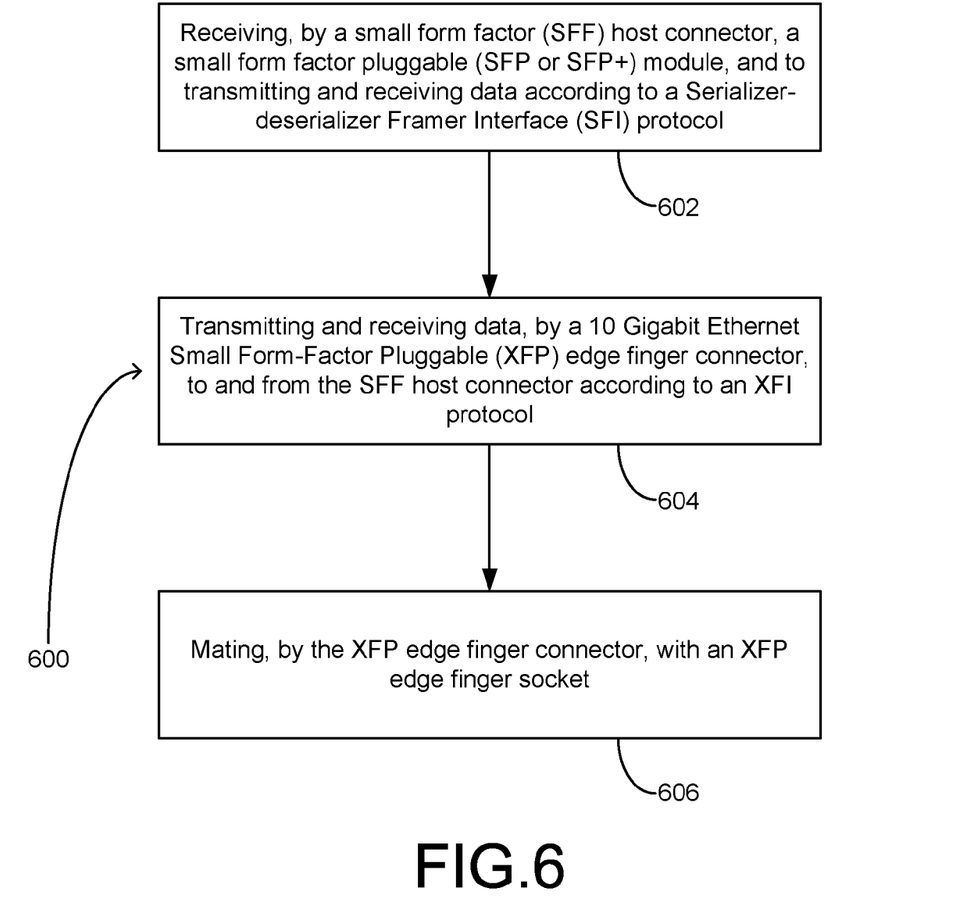
FIG. 6 is a flowchart showing a method according to an example embodiment.

FIG. 6 is a flowchart showing a method 600 according to an example embodiment. In an example embodiment, the method 600 may include receiving, by a small form factor (SFF) host connector 106, a small form factor pluggable (SFP or SFP+) module, and transmitting and receiving data according to a Serializer-deserializer Framer Interface (SFI) protocol (602). The method 600 may also include transmitting and receiving data, by a 10 Gigabit Ethernet Small Form-Factor Pluggable (XFP) edge finger connector 110, to and from the SFF host connector 106 according to the SFI protocol (604). The method 600 may also include mating, by the XFP edge finger connector 110, with an XFP edge finger socket (606).

According to an example embodiment, the SFF connector 106 may include an SFP or SFP+ cage.

According to an example embodiment, the method 600 may further include securing, by the SFF host connector 106, the SFP or SFP+ module into the SFF host connector 106, using a latch mechanism 302.

According to an example embodiment, the method 600 may further include receiving a protrusion 202 of the SFP or SFP+ module 102 into an aperture 304 of a cage spring cut-out 302 of the SFF host connector 106 and thereby locking the SFP or SFP+ module 102 into the SFF host connector 106. The method 600 may further include releasing the SFP or SFP+ module 102 in response to pressure from a lever 204 included in the SFP or SFP+ module 102 being applied to the cage spring cut-out 302.

According to an example embodiment, the transmitting and receiving data by the SFF host connector 106 may include transmitting and receiving the data via a twenty-pin small form factor pluggable host connector.

According to an example embodiment, the mating the XFP edge finger connector 110 with the XFP edge finger socket may include mating the XFP edge finger socket 110 into an XFP cage.

According to an example embodiment, the transmitting and receiving data by the XFP edge finger connector 110 to and from the SFF host connector 106 may include transmitting and receiving the data by the XFP edge finger connector 110 to and from the SFF host connector 106 via an inter-integrated circuit (i.e., I2C) control path and an SFI data path.

According to an example embodiment, the method 600 may further include retiming data received by the form factor adapter module 104 received via either the SFF host connector 106 of the XFP edge finger connector 110.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A form factor adapter module comprising:
a small form factor (SFF) host connector configured to receive a small form factor pluggable (SFP or SFP+) module and to transmit and receive data according to a Serializer-deserializer Framer Interface (SFI) protocol, the SFF host connector including an SFP or SFP+ cage;
a 10 Gigabit Ethernet Small Form-Factor Pluggable (XFP) edge finger connector configured to transmit and receive data to and from the SFF host connector according to the SFI protocol and to mate with an XFP edge finger socket;
a clock and data recovery circuit configured to retime the data transferred between the SFF host connector and the XFP edge finger connector;
an electronic dispersion compensator (EDC) included in the clock and data recovery circuit, the EDC being configured to recover the data received via the SFF host connector and via the XFP edge finger connector; and
a housing enclosing at least a portion of the SFF host connector and at least a portion of the XFP edge finger connector, the housing having a form factor configured to receive and mate with the SFP or SFP+ module and to fit into and mate with the XFP edge finger socket.

2. The form factor adapter module of claim 1, wherein the SFF host connector includes a latch mechanism configured to secure the SFP or SFP+ module into the SFF host connector.

3. The form factor adapter module of claim 1, wherein the SFF host connector includes a cage spring cut-out, the cage spring cut-out including an aperture configured to receive a protrusion of the SFP or SFP+ module and thereby lock the SFP or SFP+ module into the SFF host connector, the cage spring cut-out being configured to release the SFP or SFP+ module when pressure from a lever included in the SFP or SFP+ module is applied to the cage spring cut-out.

4. The form factor adapter module of claim 1, wherein the SFF host connector includes a twenty-pin small form factor pluggable host connector configured to receive the SFP or SFP+ module and transmit and receive data according to the SFI protocol.

5. The form factor adapter module of claim 1, wherein the XFP edge finger connector is configured to be secured into an XFP cage.

6. The form factor adapter module of claim 1, wherein the XFP edge finger connector is configured to send and receive data to and from the SFF host connector via an inter-integrated circuit control path and an XFI data path.

7. The form factor adapter module of claim 1, wherein the SFF host connector includes twenty electrical contacts and the XFP edge finger connector includes thirty electrical contacts, and at least some of the SFF host connector electrical contacts are coupled to at least some of the SFP edge finger connector contacts.

8. The form factor adapter module of claim 1, further comprising:
a clock coupled to the XFP edge finger connector and the clock and data recovery circuit, the clock being configured to:
receive a reference clock signal from a host card via the XFP edge finger connector; and
provide clock impulses to the clock and data recovery circuit based on the received reference clock signal.

9. The form factor adapter module of claim 1, further comprising:
an inter-integrated circuit bus coupled to the XFP edge finger connector, the clock and data recovery circuit, and the SFF host connector.

10. The form factor adapter module of claim 9, wherein the XFP edge finger connector is configured to provide control signals to the clock and data recovery circuit and to the SFF host connector via the inter-integrated circuit bus.

11. The form factor adapter module of claim 9, wherein the XFP edge finger connector is configured to control whether the SFF host connector communicates with the XFP edge finger connector via the inter-integrated circuit bus or via the clock and data recovery circuit.

12. The form factor adapter module of claim 1, wherein the XFP edge finger connector is configured to provide a transmitter disable signal to the SFF host connector.

13. The form factor adapter module of claim 1, further comprising a memory coupled to the clock and data recovery circuit, the memory being configured to monitor a power level of the form factor adapter module.

14. The form factor adapter module of claim 1, further comprising a logic controller configured to reset the SFF host connector, the XFP edge finger connector, and the clock and data recovery circuit.

15. A method comprising:
receiving, by a small form factor (SFF) host connector, a small form factor pluggable (SFP or SFP+) module, and transmitting and receiving data according to a Serializer-deserializer Framer Interface (SFI) protocol, the SFF host connector including an SFP or SFP+ cage;
retiming the received data by a clock and data recovery circuit;
transmitting and receiving the retimed data, by a 10 Gigabit Ethernet Small Form-Factor Pluggable (XFP) edge finger connector, to and from the SFF host connector according to an XFI protocol;
recovering the data received by the SFF host connector and by the XFP edge finger connector by an electronic dispersion compensator (EDC); and
mating, by the XFP edge finger connector, with an XFP edge finger socket,
wherein at least a portion of the SFF host connector and at least a portion of the XFP edge finger connector are enclosed by a housing, the housing having a form factor configured to receive and mate with the SFP or SFP+ module and to fit into and mate with the XFP edge finger socket.

16. The method of claim 15, further comprising securing, by the SFF host connector, the SFP or SFP+ module into the SFF host connector, using a latch mechanism.

17. The method of claim 15, further comprising:
receiving a protrusion of the SFP or SFP+ module into an aperture of a cage spring cut-out of the SFF host connector and thereby locking the SFP or SFP+ module into the SFF host connector; and
releasing the SFP or SFP+ module in response to pressure from a lever included in the SFP or SFP+ module being applied to the cage spring cut-out.

18. The method of claim 15, wherein the transmitting and receiving data by the SFF host connector includes transmitting and receiving the data via a twenty-pin small form factor pluggable host connector.

19. The method of claim 15, wherein the transmitting and receiving data by the XFP edge finger connector to and from the SFF host connector includes transmitting and receiving the data by the XFP edge finger connector to and from the SFF host connector via an inter-integrated circuit control path and an SFI data path.

20. A form factor adapter module comprising:
SFP or SFP+ means for receiving a small form factor pluggable (SFP or SFP+) module and for transmitting and receiving data to and from the SFP or SFP+ module according to a Serializer-deserializer Framer Interface (SFI) protocol, the means comprising an SFP or SFP+ cage;
XFP means for transmitting and receiving data to and from the means for receiving the SFP or SFP+ module and for mating with an XFP edge finger socket;
retiming means for retiming the data received via the SFP or SFP+ means and the XFP means;
electronic dispersion compensation (EDC) means for recovering the retimed data; and
housing means enclosing at least a portion of the SFP or SFP+ means and at least a portion of the XFP means, the housing having a form factor configured to receive and mate with the SFP or SFP+ module and to fit into and mate with the XFP edge finger socket.

* * * * *